INVENTOR.
WALTER BLAZO
BY Cullen & Cantor
ATTORNEYS

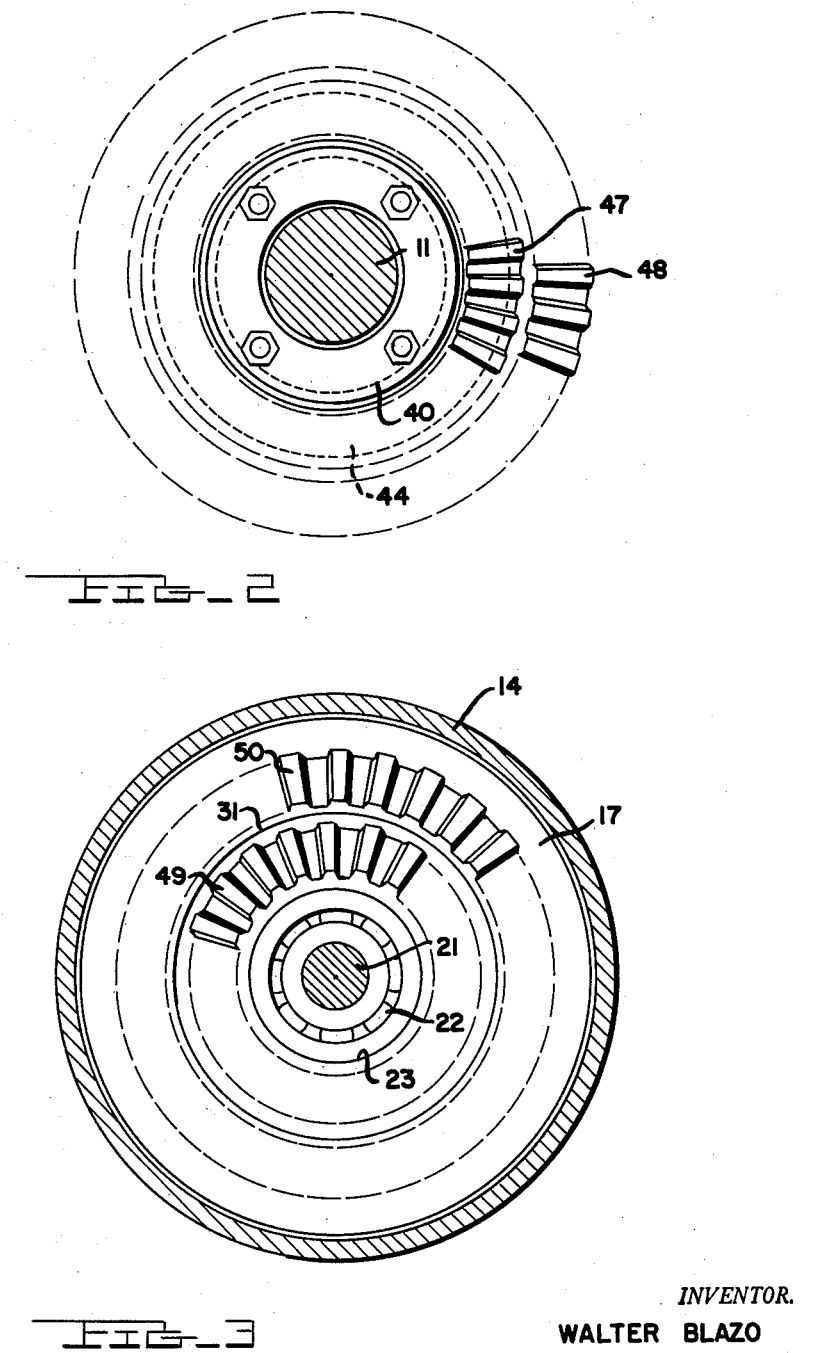

United States Patent Office 3,159,056
Patented Dec. 1, 1964

1

3,159,056
TRANSMISSION
Walter Blazo, Harper Woods, Mich.
(780 N. Fairoaks Ave., Lot 44, Sunnyvale, Calif.)
Filed Aug. 2, 1961, Ser. No. 128,873
10 Claims. (Cl. 74—751)

This invention relates to a transmission and more particularly to a variable transmission which is automatically responsive to torque requirements and is useful for transmitting torque from a power source to a driven load.

Transmissions of various types are commonly used for transmitting power from a power input to a driven load. For example, they are commonly used for automotive vehicles, marine propulsion, farm machinery, and various other types of machinery wherein the power supplied passes through a transmission which converts it into a suitable output torque for the load requirements. It is common to use combinations of gears of various types to adjust the output torque and speed to the load requirements. Generally, output torque and speed is varied by such means as manual shifts, which select various gear ratios suitable to convert input power to required output torque, or hydraulic torque convertors or the like, combined with gears, friction devices and hydraulic controls which may perform the same function automatically. The so-called automatic transmissions which in one way or another adjust the available input power to a required torque to meet load requirements are almost universally highly complicated, expensive, difficult to maintain and repair and bulky and heavy in weight. In addition, they are inherently inefficient and have inherent thermal problems.

Thus, it is an object of this invention to provide an automatic type transmission which is simplified, inexpensive, light weight, small, completely mechanical, positive drive, constant mesh, stepless and infinitely variable and which self-adjusts output torque immediately and progressively to variations in load below a known maximum.

These and other objects and advantages of this invention will become apparent upon reading the following description of which the attached drawings form a part.

In these drawings:

FIG. 2 is a fragmentary, cross-sectional view taken in the direction of arrows 2—2 of FIG. 1, the housing being omitted.

FIG. 3 is a cross-sectional view taken in the direction of arrows 3—3 of FIG. 1.

Figure 1:
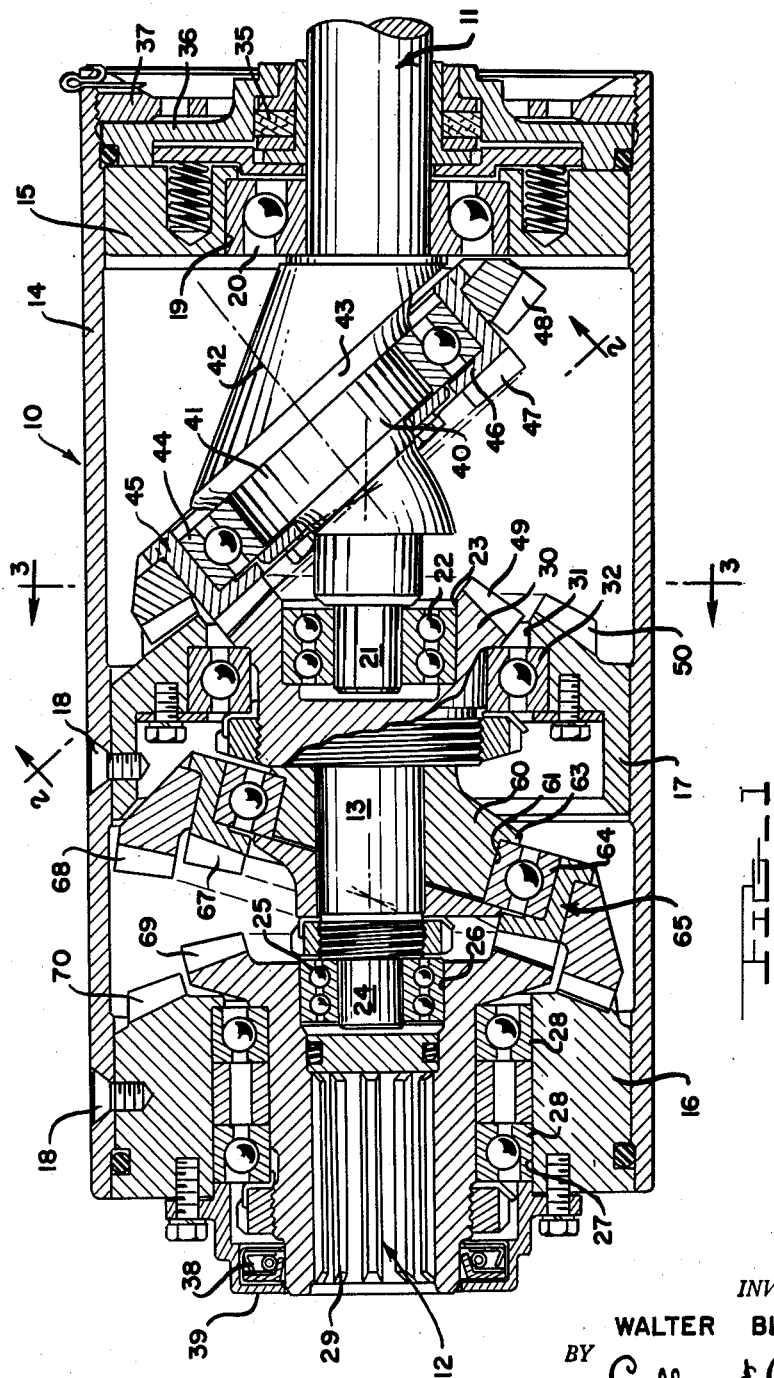
FIG. 1 is a longitudinal, medial sectional view of the transmission of this invention.

With reference particularly to FIG. 1, the transmisshion herein includes four major elements, namely, a housing 10, an input shaft 11, an output shaft 12, and an intermediate shaft 13. The housing, formed of a cylindrical shell 14, is arranged coaxial with the three shafts which are aligned end to end. The forward end of the housing is closed by means of an axially adjustable bearing retainer 15. The rear end is provided with a closure 16. Midway between the two ends is a partition 17. The closure 16 and partition are secured to the housing cylinder 14 by means of screws 18 or by pressed fittings or the like.

The input shaft 11, which extends outwardly of the forward end of the housing, passes through an opening 19 in the retainer 15 and is rotatably supported therein

2 by means of a suitable thrust bearing 20. The rear end of the input shaft is formed as a reduced throat 21 fitted into and rotatably supported by a ball bearing 22 arranged within a bore 23 in the forward end of the intermediate shaft 13. Likewise, the rear end of the intermediate shaft is also formed as a reduced throat 24 fitted into and rotatably supported by a bearing 25 supported within bore 26 at the forward end of output shaft 12. Output shaft 12 passes through an opening 27 in rear closure 16 and is rotatably supported therein by suitable ball bearings 28.

In the embodiment illustrated, the output shaft 12 is formed as a hollow shaft with an interior spline 29 for connection to a splined driven shaft which supplies power to the load (not illustrated). However, the output shaft may be formed solid as in the case of the input shaft.

The forward end of the intermediate shaft 13 is enlarged at 30 and passes through an opening 31 formed in the housing partition 17 and is rotatably supported therein by means of a ball bearing 32. Thus, it can be seen that each of the shafts is independently rotatable about its axis and that the shafts interfit and are arranged coaxial with each other as well as with the housing cylinder 14.

Suitable lock nuts are provided to hold the various bearings in position as shown in the drawing. In addition, a conventional high speed, oil sealing means 35 held in place by a seal retainer 36 and an axially adjustable screw 37 is provided to seal the input shaft 11 to the retainer 15. A conventional slow speed oil seal 38 contained within a bearing closure 39 is provided to seal the output shaft 12 to the closure 16, to thus avoid leakage of lubricating oil or the like which may be contained within the unit and to keep out dirt, etc. The specific form of sealing means for sealing the shaft to the housing closures and the locking nut means for holding the various bearings in position form no part of this invention.

A hub 40 is formed on the input shaft, the hub having a circular flat rim 41 so that it is disc-like or cylindrical in shape. The hub central axis 42 is canted at an acute angle relative to the input shaft central axis and in addition, the hub is arranged off center relative to the input shaft axis. Thus, as the input shaft rotates, the hub wobbles about the shaft with its axis generating a cone about the shaft axis. The forward end of the hub is provided with a continuous shoulder 43 at the rim edge. A ball thrust bearing 44 is mounted upon the rim and mounted upon the ball bearing is a ring 45 provided with a lip 46 which overrides the rear end face of the ball bearing 44. The ring is provided with two annular face gears, namely an inner face gear 47 which is formed as a crown gear and an outer gear formed as a bevel gear 48, both gears being coaxial with the hub axis 42. As illustrated in the drawings, the ring 45 is formed of two concentric, interconnected parts, with the crown gear being on the inner part and the bevel gear being on the outer part, the two parts being secured together by any suitable key means. However, the ring may also be made in one piece since the two parts, in effect, function as one piece.

The enlarged portion 30 of the intermediate shaft 13 is formed with a bevel gear 49 whose axis is coincident with the shaft axis. This bevel gear is meshed with the crown gear 47 of the ring 45. In addition, a bevel gear 50 is formed on the forward face of the partition 17, wherein this bevel gear is fixed to the housing cylinder. The fixed bevel gear 50 meshes with the outer bevel gear 48 of the ring 45.

The locus of the canted axis 42 of the hub 40 is common to the vertex of the pitch cone angle of the bevel gear 49 on the end of the intermediate shaft 13, the bevel gear 48, and the stationary bevel gear 50. The angle of the canted axis is determined by conventional rules and formulas for bevel gearing wherein the angle between shafts is greater than 90 degrees and pitch cone angle of bevel gear 48, and crown gear 47 is 90 degrees or less. Thus, as the input shaft 11 rotates, the hub axis wobbles about the shaft axis with the hub axis generating a cone about the shaft axis.

A collar or hub 60 is fixed to the intermediate shaft 13, the hub having an outer cylindrical rim 61, and with its axis arranged at an acute angle and off-center relative to the axis of the intermediate shaft. The rim 61 is bounded at its forward end with a shoulder 63 and supports a ball bearing 64 upon which ring 65 is mounted. Ring 65 is provided with two face gears, namely, inner crown gear 67 and outer bevel gear 68, which mesh respectively with bevel gear 69 formed on the forward end of output shaft 12 and with a fixed bevel gear 70 formed on the closure 16.

The locus of the canted axis of the hub 60, is common to the vertex of the pitch cone angles of gears 68, 69 and 70. The angle of the canted axis is determined by conventional rules and formulas for bevel gearing wherein the angle between shaft axis and canted axis is greater than 90 degrees and pitch cone angle of bevel gear 70 is 90 degrees or less. Hence, hub 60 wobbles about its shaft axis as the shaft rotates and its axis swings to generate a cone about the shaft axis.

The tooth form of the various gears mentioned may be of any of the conventional involute types or it could be of some special tooth form and either a straight tooth or spiral tooth configuration. The particular tooth form selected will vary with the use and loads encountered.

While the number of teeth of each gear is a design matter, and would be selected by the designer in accordance with the desired torque and load capacity of the transmission, one set of sample gears are given below for purposes of illustration.

SAMPLE GEARS

| Gear No. | No. of Teeth | Meshes with Gear No. | No. of Teeth |
|---|---|---|---|
| 47 | 33T | 49 | 25T |
| 48 | 44T | 50 | 38T |
| 67 | 33T | 69 | 32T |
| 68 | 44T | 70 | 41T |

In this construction, the various drive gears are rotatably mounted relative to their respective drive shafts. Hence, they impart turning forces to the driven gears by utilizing both the thrust and tangential force components, applied thru the angle of obliquity of action or the tooth pressure angle. Thus, as torque is applied to input shaft 11, the combined crown gear 47 and bevel gear 48, mesh with fixed gear 50 and bevel gear 49 at a continuously changing radial position of pitch cone tangency, with the rate of change equal to input r.p.m. Therefore, for example only, if gear 48 and gear 50 have equal numbers of teeth, no radial change per revolution would occur in gear 48 or 47, then if gear 47 has a greater number of teeth than the number of gear teeth of gear 49, with which it is in mesh, each input revolution of shaft 11 would cause a radial change of position to the intermediate shaft 13, equal to the difference in the number of teeth. Thus, if gear 47 had 40 teeth and gear 49 had 39 teeth, a 1/40 of a revolution radial change of position would occur in the intermediate shaft 13. In conventional gearing wherein gears are keyed to their respective shafts, a gear ratio is determined by dividing the number of teeth on the larger gear by the number of teeth on the smaller gear. In the un-conventional gearing, embodied in this invention, wherein drive gears are not axially secured to their respective drive shafts, a gear ratio is determined by dividing the difference between the numbers of gear teeth on the large and small gears, by the numbers of teeth on the larger gear. The selection of the gear ratios then becomes a matter of design.

*Operation*

In order to describe the operation of this device, three general, but different conditions will be separtely discussed as follows: direct drive, increase load on output shaft, increase r.p.m. on input shaft.

Where the input power and the output load are so related that the housing turns at the same speed as the input shaft, the device herein generally acts as a shaft coupling, that is, the various gears and the entire unit including the input shaft, intermediate shaft and output shaft, various gears and housing all rotate together as a unit. Thus, the output shaft is directly connected or coupled to the input shaft and the output r.p.m. is the same as the input r.p.m.

In a second general conditions, where the input shaft is operating at a fixed r.p.m. and an increased load is put upon the output shaft, then the output shaft slows down to operate at a lower r.p.m. but higher torque. When this happens, the reduced rotation of the output shaft bevel gear 69 causes gears 67–68 to rotate relative to the intermediate shaft upon which they are mounted and this drives housing bevel gear 70 to rotate the housing. The rotating housing causes the housing bevel gear 50 to rotate the gears 47–48 relative to the input shaft which in turn, because of the meshing between gear 47 and intermediate shaft bevel gear 49, causes the intermediate shaft to rotate. This in turn drives the gears 67–68 to drive the output shaft bevel gear 69. Thus, a complete circuit occurs and the r.p.m. of the ouput shaft is now adjusted to a lower r.p.m. with a torque increase due to the effect of the gearing. All this time, the input shaft is operating at the same input r.p.m. and torque. Thus, the unit adjusts itself automatically and immediately to respond to variations in the load on the output shaft.

A third condition which occurs is where the output shaft is stationary and the unit is started in operation or where the operation is at one r.p.m. and torque and the input shaft is given a greater input torque and r.p.m. to thus likewise effect the output torque and r.p.m. In this case, the gears 47–48 rotate relative to the input shaft 11 to thus drive the intermediate shaft bevel gear 49 and the intermediate shaft 13 and also to drive the housing bevel gear 50 to rotate the housing. The intermediate shaft rotation rotates gears 67–68. However, the second housing bevel gear 70 rotates at a different rate than the bevel gear 68, namely at the same rate as housing bevel gear 50 so that the gears 67–68 are slowed down somewhat by the action of the housing bevel gear 70. Then, crown gear 67, in meshing with output shaft bevel gear 69 drives the output shaft 12. In this manner, the unit quickly adjusts to the increased r.p.m. Thus, it can be seen that the unit operates as an infinitely variable transmission between the ranges wherein the housing is stationary, and wherein it is rotating at input shaft speed, self-adjusts itself to variations in input-output loads.

For certain purposes it may be desirable to hold the housing against rotation to thus form it as a stationary housing. The transmission then functions as a fixed ratio, compound, speed reduction unit that is not variable. In this case, bevel gears 48 and 68 simply roll over the respective housing gears 50 and 70 with which they mesh rather than rotating the housing. In so doing, housing gears 50 and 70 restrict radial turning moments of gears 47 and 48 and gears 68 and 67 and thereby produce an unbalanced couple on gear 49 and gear 69 through which torque is transmitted.

With this construction it can be seen that because the various gears are not keyed or otherwise fixed to their respective shafts, the gear tooth loads are proportionately and simultaneously distributed to all of the gears in the system. Thus, the horsepower capacity of the illustrated transmission is four times the allowable load on one tooth. In addition, there is what amounts to a torque sensing or feedback result in that the transmission responds immediately to the output load or the torque required to meet the output load.

This invention may be further developed within the scope of the following attached claims. Accordingly, the foregoing description should be read as being merely illustrative of an operative embodiment of this invention and not in a strictly limiting sense.

I now claim:
1. A transmission comprising:
   (a) a housing,
   (b) an input shaft rotatably mounted in the housing,
   (c) a hub fixed to the input shaft for rotation therewith,
   (d) the axis of the hub being tilted relative to, and intersecting, the input shaft axis at an acute angle, so that the hub axis swings about the input shaft axis as the latter shaft rotates and thereby generates a cone having the input shaft axis as its altitude,
   (e) a gear ring journaled co-axially upon the hub,
   (f) two complete gears on the gear ring,
   (g) a first housing gear secured to the housing co-axially of the input shaft and
   (h) meshing with one of the gears on the gear ring,
   (i) a second shaft rotatably mounted in end-to-end co-axial relationship with the input shaft,
   (j) a gear formed co-axially on one end of the second shaft
   (k) and meshing with the other gear on the gear ring,
   (l) a hub fixed in axially inclined relation to the second shaft with the axis of the latter hub in intersecting, acute angle relation with the axis of the second shaft similarly to that of the hub fixed to the input shaft,
   (m) a gear journaled co-axially on the hub of the second shaft,
   (n) and a second housing gear fixed to the housing co-axially of the shafts and
   (o) meshing with the gear journaled on the hub of the second shaft,
whereby torque applied to the input shaft will be transmitted through said gears to the second shaft.

2. A construction as defined in claim 1 and wherein said housing is rotatable about an axis coincident with the shaft axes and relative to said shafts.

3. A construction as defined in claim 1, and said housing being held against rotation.

4. A construction as defined in claim 1, and wherein some of the gears are bevel gears, and wherein the hub axis intersects the shaft axis at a point common to the vertex of the ptich cone angle of each of said gears.

5. A transmission comprising a housing and three shafts, namely, an input shaft, an intermediate shaft, and an output shaft, the shafts being arranged coaxially and end to end and each being rotatably mounted within the housing; first gear means interconnecting the input shaft to the intermediate shaft and to the housing, second gear means interconnecting the intermediate shaft to the output shaft and to the housing; each of said gear means comprising a hub having a circular outer rim fixed to each of the two interconnected shafts, each hub being arranged off-center and with its axis at an acute angle relative to the shaft to which it is fixed, a ring rotatably mounted upon each rim, each ring having two annular gears formed thereon, namely, an inner face gear and an outer bevel gear; a shaft bevel gear formed on an end of each of the intermediate and output shafts and arranged coaxial with the shafts and meshing with the inner face gear of the preceding shaft; and two fixed bevel gears secured to the housing, arranged coaxial with the shafts and surrounding the shaft bevel gears, one of the gears secured to the housing meshing with each ring outer bevel gear; whereby torque applied to the input shaft will be transmitted to the output shaft.

6. A construction as defined in claim 5 and wherein said housing is rotatable about the shaft axis and relative to the shafts.

7. A construction as defined in claim 5 and said housing being fixed against rotation.

8. A variable transmission comprising a substantially cylindrically shaped, hollow housing having a forward end and a rear end and three shafts, namely an input shaft extending out of the housing forward end, an output shaft at the housing rear end and an intermediate shaft arranged between the input and output shafts, all the shafts being arranged coaxial with one another and with the housing and with each of the shafts being rotatbly mounted within the housing for rotation relative to each other and to the housing; first gear means interconnecting the input shaft to the intermediate shaft and to the housing and second gear means interconnecting the intermediate shaft to the output shaft and to the housing; said gear means comprising a hub fixed to the input shaft and a hub fixed to the intermediate shaft, the hubs each having circular outer rims, and with the hubs each being off-center relative to their respective shafts, and the axis of each hub being canted at an acute angle relative to its respective shaft axis; each hub having a ring rotatably mounted upon its rim, the rings being coaxial with their respective hubs; and the rear face of each ring being provided with two annular face gears, namely, an inner crown gear and an outer bevel gear; the forward ends of the intermediate shaft and the output shaft each being formed with a shaft bevel gear arranged coaxial with the shaft axes and each shaft bevel gear being surrounded by a fixed bevel gear arranged coaxial therewith and fixed to the housing; the ring crown gears each meshing with the shaft bevel gears and the ring bevel gears each meshing with the fixed bevel gears; the gears of the first gear means having gear ratios that are different from the gears of the second gear means.

9. A construction as defined in claim 7 and wherein the housing is also rotatable about its axis, and is supported by the respective shafts.

10. A transmission comprising:
   (a) a rotatable housing,
   (b) an input shaft rotatably mounted in the housing,
   (c) a hub fixed to the input shaft for rotation therewith,
   (d) the axis of the hub being tilted relative to, and intersecting, the input shaft axis at an acute angle, so that the hub axis swings about the input shaft axis as the latter shaft rotates and thereby generates a cone having the input shaft axis as its altitude,
   (e) a gear ring journaled co-axially upon the hub,
   (f) two complete gears formed co-axially on the gear ring,
   (g) a first housing gear secured to the housing co-axially of the input shaft and surrounding the gear ring,
   (h) the first housing gear meshing with one of the gears formed on the gear ring,
   (i) a second shaft rotatably mounted in end-to-end co-axial relationship with the input shaft, and rotatable relative to the housing,
   (j) a gear formed co-axially on the second shaft
   (k) and meshing with the other gear on the gear ring,
   (l) a hub fixed in axially inclined relation to the second shaft with the axis of the latter hub in intersecting, acute angle relation with the axis of the second shaft similarly to that of the hub fixed to the input shaft, (m) a gear journaled co-axially on the hub of the second shaft, (n) and a second housing gear fixed to the housing co-axially of the shafts and surrounding the gear journaled on the hub of the second shaft, (o) the second housing gear meshing with the gear journaled on the hub of the second shaft, whereby torque applied to the input shaft will be transmitted through said gears to the second shaft.

References Cited in the file of this patent

UNITED STATES PATENTS

| | | |
|---|---|---|
| 1,144,807 | Bronner et al. | July 29, 1915 |
| 1,144,808 | Bronner et al. | July 29, 1915 |

FOREIGN PATENTS

| | | |
|---|---|---|
| 398,816 | Germany | July 15, 1924 |